July 22, 1969 T. GERING ET AL 3,457,439
DEVICE FOR THE COOLING OF ROTATING ELECTRICAL MACHINES OF
COMPLETELY CLOSED DESIGN
Filed Feb. 28, 1967 2 Sheets-Sheet 1

TIBOR GERING
GYÖRGY KLOIBER
ZOLTAN LENGYEL

INVENTORS

BY Karl J. Ross

ATTORNEY

TIBOR GERING
GYÖRGY KLOIBER
ZOLTAN LENGYEL
INVENTORS

BY Karl F. Ross

ATTORNEY

United States Patent Office 3,457,439
Patented July 22, 1969

3,457,439
DEVICE FOR THE COOLING OF ROTATING ELECTRICAL MACHINES OF COMPLETELY CLOSED DESIGN
Tibor Géring, György Kloiber, and Zoltán Lengyel, Budapest, Hungary, assignors to Ganz Villamossagi Muvek, Budapest, Hungary
Filed Feb. 28, 1967, Ser. No. 619,412
Claims priority, application Hungary, Mar. 8, 1966, GE–587
Int. Cl. H02k 9/00, 3/24, 1/32
U.S. Cl. 310—52                      2 Claims

ABSTRACT OF THE DISCLOSURE

The cooling system of an electrical machine comprises a heat exchanger with an annular array of axially extending ducts peripherally subdivided into a plurality of sectors. A primary cooling fluid traverses the ducts from one end of the array to the other while a secondary cooling fluid, circulated by fan blades on a rotor, passes between the ducts of alternate sectors in opposite axial directions after flowing radially outwardly through slots in the rotor and stator armatures.

---

The endeavor to achieve improved cooling of electrical machines is known. The result of improved cooling is the improved specific efficiency of the electrical machines, a diminution in the weight of the machine and a greater ability of electrical machines to be installed at a predetermined location.

The invention relates to solutions for the problem of cooling electrical machines of completely closed design.

For the cooling of electrical machines of completely closed design, many solutions are already known. These designs may be divided into two groups. In the first group, the coolant is in direct contact with the part of the machine to be cooled, i.e. a cooling can be effected only if a heat exchanger is provided.

Whereas the utilisation of direct cooling is generally worthwhile only in the case of machines having a very high output or in the case of machines intended for special purposes, owing to the fact that it is extremely costly, the use of direct cooling is also advantageous with closed-type machines of average or high capacity since in the case of the latter machines the active parts thereof (the iron elements and the winding) may be of a design which is very similar to those in machines of conventional open type.

The invention relates to a system for the cooling of this kind of completely closed electrical machines, wherein the coolant heated by the electric-energy losses of the machine is re-cooled in a heat exchanger extending along the periphery of the machine. Also in the case of these machines, two species are known, i.e. those involving unidirectional inner cooling and those having split internal circulation. In machines having unidirectional circulation or aeration, the entire quantity of inner coolant flows in the longitudinal direction over all the cross-sections of the heat exchanger, whereas in machines with split inner circulation of aeration the direction of flow is opposite in the two halves of the heat exchanger and only half of the complete quantity of coolant flows in each case over one cross-section of the heat exchanger.

It is the main object of the invention to make the cooling of the active parts of the machine more uniform and more efficient.

The essence of the invention is the utilisation of guide plates of special design in two end compartments or chambers of the closed electrical machine, by means of which the flow of the coolant is directed on both sides in the active parts of the machine, flowing unidirectionally along the periphery of the heat exchanger which is divided into sectors the flows in alternate sectors passing in opposite directions.

As compared with machines having unidirectional internal circulation, the main advantage of the system according to the invention consists in that the two ends of the laminated stator core and the coil-winding heads receive re-cooled coolant directly from the heat exchanger, so that the cooling of the active parts becomes much more uniform and much more effective than in machines of the uniflow type wherein only the coil winding heads on one side and only one end of the laminated stator core are supplied with fresh coolant. In the system according to the invention, however, the cooling of the coil-winding heads is also improved in consequence of the fact that the cooling agent is blown onto the coil-winding heads by the fans disposed beneath these heads.

The axial extent of the machine is considerably shortened by reason of the fact that the space otherwise required for the inner fan is no longer needed as the fans can be disposed below the stator winding heads. It is true that this arrangement decreases the diameter of the fans, but in the case of high-capacity machines of large diameter this diminution is relatively small and it is amply compensated by the fact that instead of one fan, as in the case of machines having unidirectional circulation, two fans are provided.

A further advantage of the design according to the invention, as compared with unidirectional internal circulation is that, since only half the quantity of cooling agent enters the active part of the machine from one side, it becomes possible to construct machines with a substantially longer lamianted stator core and a substantially smaller diameter so that the ratio of specific weight to unit capacity becomes more advantageous.

The advantage of the arrangement according to the invention, as compared with machines having internal circulation on both sides, shows itself in the fact that the complete quantity of inner cooling agent flows through the entire heat exchanger, whereby it becomes possible to achieve higher flow velocities and better thermal transmission conditions than would be possible with bilateral circulation.

An embodiment of the invention is illustrated in the drawing, wherein.

In the case of the design discussed by way of example, the outer cooling agent flows via a fan $a$ into a heat exchanger $b$, and, after traversing the latter, leaves the machine. Of course, it is also possible to provide liquid cooling, in which case the outer coolant is not air but a liquid.

The circuit of the inner cooling agent is as follows:

A part of the cooling agent combines, after flowing through slots $c$ in the rotor and $d$ in the stator, with the cooling agent of the coil-winding heads and is re-cooled after flowing through the heat exchanger.

Figure 1:
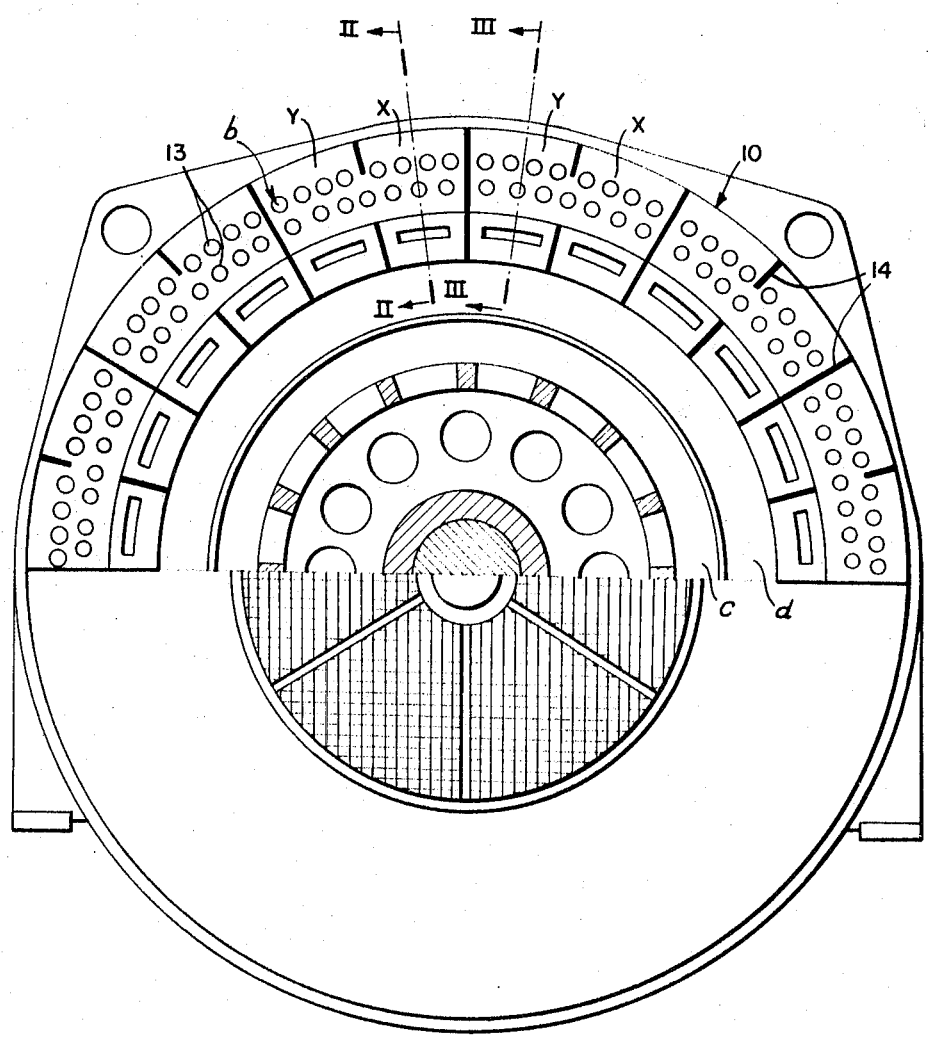
FIG. 1 shows a cross-section through a machine manufactured in accordance with the teachings of the invention.
Figure 2:
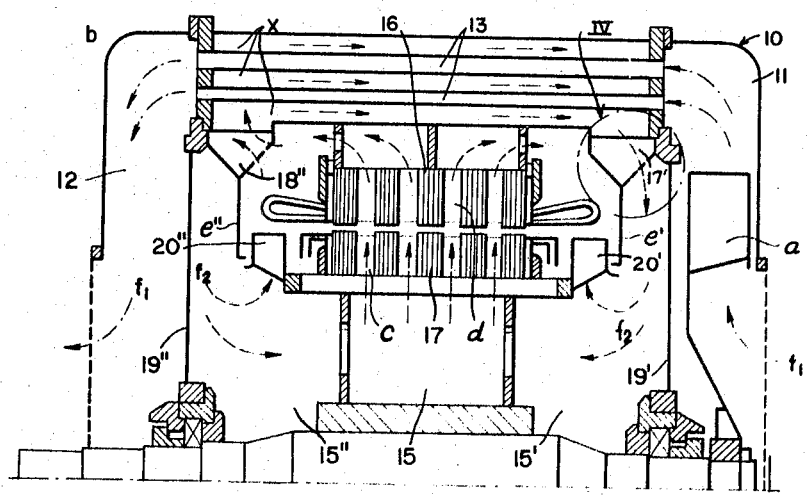
FIG. 2 shows a partial longitudinal section taken on the line II—II of FIG. 1.
Figure 3:
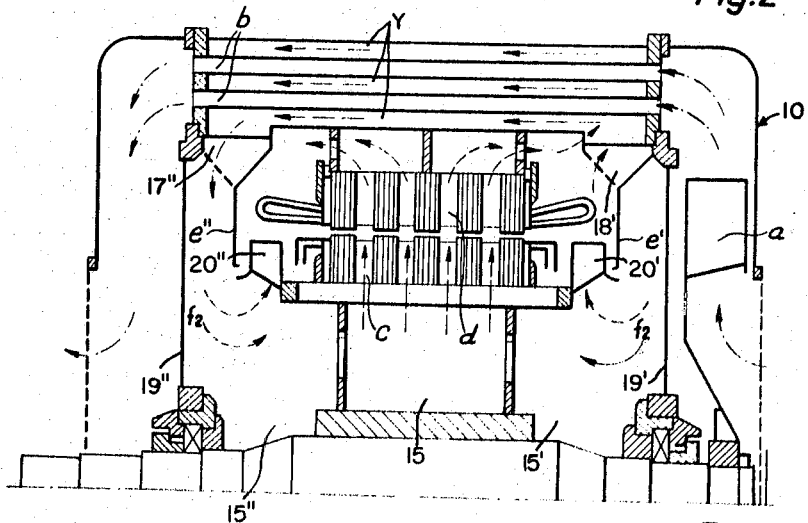
FIG. 3 shows a section similar to that of FIG. 2, taken on the line III—III of FIG. 1.
Figure 4:
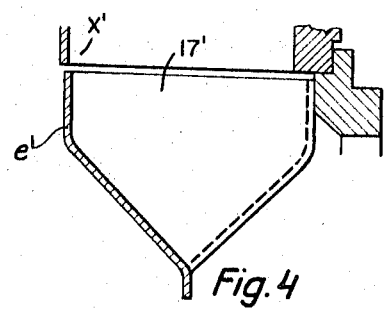
FIG. 4 shows a detail in the area IV of FIG. 2.

FIGS. 2 and 3 show clearly the flow directions of the inner coolant, which are mutually opposite to each other in adjoining sectors $x$ and $y$. For the inner coolant, the flow in opposite directions in the juxtaposed sectors of the heat exchanger is established by deflecting plates $e'$ and $e''$ best seen in FIG. 4.

More particularly, the cylindrical housing 10 of the machine forms a pair of AND compartments 11, 12 which communicates with the axially extending ducts 13 of heat exchanger b whereby the primary cooling fluid $f_1$, aspirated into compartment 11 by the fan a, axially traverses the dots 13 before escaping from the housing via compartment 12. The aforementioned sectors x and y are formed by radial partitions 14 and communicate with a central chamber 15', 15, 15" of the housing, accommodating the stator 16 and the rotor 17, via generally radial passages 17', 18' and 17", 18" respectively formed by the deflecting plates e' and e". As shown in FIG. 2, the passages 17' connect the right-hand ends of alternate sectors x with a space 15' of the central chamber adjacent its end wall 19' while the passages 18" connect the left-hand ends of these sectors with the intermediate portion 15 of this chamber containing the stator and rotor members 16, 17; conversely as illustrated in FIG. 3, passages 18' lead from this intermediate region 15 to the right-hand ends of the intervening sectors y while the passages 17" connect the left-hand ends of the latter compartments with a space 15" of the central chamber adjacent its other end wall 19".

As the rotor 17 turns about the axis of housing 10, fan blades 20', 20" carried on its opposite ends circulate the secondary cooling fluid $f_2$ in a closed path between chamber 15', 15, 15" and the sectors x, y of the heat exchanger b, this path extending from the radial rotor and stator slots c, d, through passages 18" via sectors x and passages 17' back to the central region 15 of the housing and thence via passages 18' (FIG. 3), sectors y and passages 17" back toward the same central region.

The meandering shape of the deflecting plates e' and e", required to guide the fluid $f_2$ in the aforedescribed manner, can best be ascertained from FIG. 3 which shows one of the passages 17', formed by plate e', on a larger scale, together with an adjoining outlet port x' of one of the heat-exchanger sectors x; the corresponding inlet port registers at the same time with an identically shaped passage 18" (FIG. 2) of plate e".

What is claimed is:

1. In an electrical machine having a stator and a rotor centered in nested relationship on the axis of a generally cylindrical housing, the combination therewith of:

a heat exchanger comprising an annular array of axially extending ducts disposed adjacent the inner wall surface of said housing, said array having radial partition means peripherally subdividing same into a plurality of sectors, said housing being provided with a pair of end compartments communicating with said ducts at opposite ends of the array, said rotor and stator being disposed in a central chamber between said end compartments;

first circulating means for passing primary cooling fluid from one of said end compartments through said ducts to the other end compartment;

second circulating means in said central chamber for moving a secondary cooling fluid past said rotor and stator and radially outwardly into contact with said ducts along a closed circulation path;

and baffle means in said closed circulation path for guiding said secondary cooling fluid in opposite axial directions in adjacent sectors of said array.

2. The combination defined in claim 1 wherein said baffle means comprises a pair of deflecting plates respectively disposed adjacent said end compartments, each of said plates defining a set of generally outwardly directed passages connecting said central chamber with alternate sectors of said array, the sets of passages formed by said plates being relatively staggered by the width of a sector.

References Cited

UNITED STATES PATENTS 2,683,227   7/1954   Beckwith _____ 310—64

WARREN E. RAY, Primary Examiner

R. SKUDY, Assistant Examiner

U.S. Cl. X.R.

310—64